(12) United States Patent
John et al.

(10) Patent No.: US 11,920,945 B2
(45) Date of Patent: *Mar. 5, 2024

(54) LANDMARK-ASSISTED NAVIGATION

(71) Applicant: GOOGLE LLC, Mountain View, CA (US)

(72) Inventors: John Payyappillil John, Mountain View, CA (US); Jeffrey Albertson, Mountain View, CA (US); Natalie O'Connell Williams, Mountain View, CA (US); Amanda Bishop, Mountain View, CA (US); Justin Joseph Thorsen, Mountain View, CA (US); Jiexi Lu, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 18 days.

This patent is subject to a terminal disclaimer.

(21) Appl. No.: 17/592,695

(22) Filed: Feb. 4, 2022

(65) Prior Publication Data

US 2022/0155091 A1 May 19, 2022

Related U.S. Application Data

(63) Continuation of application No. 16/328,920, filed as application No. PCT/US2017/064690 on Dec. 5, 2017, now Pat. No. 11,274,935.

(51) Int. Cl.
*G01C 21/36* (2006.01)
*G01C 21/34* (2006.01)

(52) U.S. Cl.
CPC ..... *G01C 21/3644* (2013.01); *G01C 21/3407* (2013.01); *G01C 21/3667* (2013.01)

(58) Field of Classification Search
CPC ............ G01C 21/3644; G01C 21/3667; G01C 21/3407
See application file for complete search history.

(56) References Cited

U.S. PATENT DOCUMENTS 5,544,060 A 8/1996 Fujii et al.
6,148,090 A 11/2000 Narioka
(Continued)

FOREIGN PATENT DOCUMENTS

CN 101135565 A 3/2008
CN 101553709 A 10/2009
(Continued)

OTHER PUBLICATIONS

Office Action and Search Report for Chinese Patent Application No. 201780092008.7, dated Feb. 11, 2023.
(Continued)

*Primary Examiner* — Rami Khatib
(74) *Attorney, Agent, or Firm* — MARSHALL, GERSTEIN & BORUN LLP

(57) ABSTRACT

A computer-implemented method for providing landmark-assisted navigation guidance by selectively utilizing database information includes receiving navigation requests from one or more mobile computing devices, each of the requests being associated with a respective starting point, destination, and travel mode. For each navigation request, a corresponding route to be depicted in a corresponding digital map is determined. For each navigation request associated with a first travel mode, corresponding points of interest (POIs) are determined from among a plurality of POIs stored in a database. The corresponding POIs are determined based at least on whether the corresponding POIs are associated with any landmark category. For each navigation request associated with a second travel mode, corresponding POIs (Continued)

are determined irrespective of whether the corresponding POIs are associated with any landmark categories.

20 Claims, 9 Drawing Sheets

(56) References Cited

U.S. PATENT DOCUMENTS

| | | |
|---|---|---|
| 6,317,686 B1 | 11/2001 | Ran |
| 7,480,546 B2 | 1/2009 | Kamdar et al. |
| 8,699,991 B2 | 4/2014 | Fasold |
| 8,775,068 B2 | 7/2014 | Pylappan et al. |
| 9,459,115 B1 | 10/2016 | Elliott et al. |
| 9,500,494 B2 | 11/2016 | van Os et al. |
| 9,587,952 B1 | 3/2017 | Slusar et al. |
| 9,619,138 B2 | 4/2017 | Piippo et al. |
| 9,683,862 B2 | 6/2017 | Nishikawa et al. |
| 10,036,641 B1 | 7/2018 | Iland et al. |
| 10,359,294 B2 | 7/2019 | Graf et al. |
| 11,055,324 B1 | 7/2021 | Inoue et al. |
| 2003/0078727 A1 | 4/2003 | Komatsu |
| 2006/0212217 A1 | 9/2006 | Sheha et al. |
| 2006/0287819 A1 | 12/2006 | Brulle-Drews et al. |
| 2007/0260393 A1 | 11/2007 | Abernethy, Jr. et al. |
| 2009/0299620 A1 | 12/2009 | Shin et al. |
| 2011/0112750 A1 | 5/2011 | Lukassen |
| 2011/0121993 A1 | 5/2011 | Davis et al. |
| 2011/0177845 A1 | 7/2011 | Fasold |
| 2011/0307166 A1 | 12/2011 | Hiesternnann et al. |
| 2012/0161984 A1 | 6/2012 | Amir et al. |
| 2012/0253488 A1 | 10/2012 | Shaw et al. |
| 2012/0290146 A1 | 11/2012 | Dedes et al. |
| 2013/0325321 A1 | 12/2013 | Pylappan et al. |
| 2013/0325326 A1 | 12/2013 | Blumenberg et al. |
| 2013/0338918 A1 | 12/2013 | Zyskowski et al. |
| 2014/0012497 A1 | 1/2014 | Pierfelice et al. |
| 2014/0115535 A1 | 4/2014 | Cocco et al. |
| 2014/0222340 A1 | 8/2014 | Celia |
| 2014/0359510 A1 | 12/2014 | Graf et al. |
| 2014/0365122 A1 | 12/2014 | McGavran et al. |
| 2015/0169573 A1 | 6/2015 | Arora et al. |
| 2015/0177013 A1 | 6/2015 | Siliski et al. |
| 2015/0219469 A1 | 8/2015 | Zyskowski et al. |
| 2015/0253143 A1 | 9/2015 | Bailiang et al. |
| 2015/0285652 A1 | 10/2015 | Peri et al. |
| 2015/0300832 A1 | 10/2015 | Moore et al. |
| 2015/0323329 A1 | 11/2015 | Lord et al. |
| 2015/0369623 A1* | 12/2015 | Blumenberg ............ G06T 3/40 701/532 |
| 2016/0018238 A1 | 1/2016 | Grabar et al. |
| 2016/0195403 A1* | 7/2016 | Tuukkanen ........ G01C 21/3423 701/533 |
| 2016/0202074 A1 | 7/2016 | Woodard et al. |
| 2016/0364645 A1 | 12/2016 | Ulloa Paredes et al. |
| 2016/0371800 A1 | 12/2016 | Kirshenboim |
| 2017/0103442 A1 | 4/2017 | Wright |
| 2017/0213273 A1 | 7/2017 | Dietrich et al. |
| 2017/0254663 A1 | 9/2017 | McGavran et al. |
| 2017/0323249 A1 | 11/2017 | Khasis |
| 2017/0358113 A1 | 12/2017 | Bray et al. |
| 2018/0061150 A1 | 3/2018 | Harish et al. |
| 2018/0231386 A1 | 8/2018 | Bellotti et al. |
| 2018/0364062 A1 | 12/2018 | Wang et al. |
| 2019/0033081 A1* | 1/2019 | King ..................... G01C 21/20 |
| 2019/0086223 A1 | 3/2019 | Tanaka et al. |
| 2020/0064139 A1 | 2/2020 | Mieth et al. |
| 2020/0408546 A1 | 12/2020 | Vaughn et al. |
| 2021/0172758 A1 | 6/2021 | John et al. |

FOREIGN PATENT DOCUMENTS

| | | |
|---|---|---|
| CN | 101715165 A | 5/2010 |
| CN | 102141405 A | 8/2011 |
| CN | 102207796 A | 10/2011 |
| CN | 102265254 A | 11/2011 |
| CN | 102782450 A | 11/2012 |
| CN | 102819388 A | 12/2012 |
| CN | 102945116 A | 2/2013 |
| CN | 102954795 A | 3/2013 |
| CN | 103003789 A | 3/2013 |
| CN | 103210281 A | 7/2013 |
| CN | 103727949 A | 4/2014 |
| CN | 103729115 A | 4/2014 |
| CN | 103900595 A | 7/2014 |
| CN | 104238938 A | 12/2014 |
| CN | 104335008 A | 2/2015 |
| CN | 104636106 A | 5/2015 |
| CN | 104769540 A | 7/2015 |
| CN | 104781779 A | 7/2015 |
| CN | 104850660 A | 8/2015 |
| CN | 104978124 A | 10/2015 |
| CN | 104991702 A | 10/2015 |
| CN | 105005429 A | 10/2015 |
| CN | 105115515 A | 12/2015 |
| CN | 105630310 A | 6/2016 |
| CN | 106068442 A | 11/2016 |
| CN | 106354401 A | 1/2017 |
| CN | 106461410 A | 2/2017 |
| CN | 106643771 A | 5/2017 |
| CN | 107209022 A | 9/2017 |
| EP | 1 918 895 A2 | 5/2008 |
| EP | 2 136 184 A2 | 12/2009 |
| EP | 2 172 746 A1 | 4/2010 |
| EP | 2 533 229 A1 | 12/2012 |
| JP | H07-65288 A | 3/1995 |
| JP | H08-75495 A | 3/1996 |
| JP | H10-153449 A | 6/1998 |
| JP | 2000-131085 A | 5/2000 |
| JP | 2001-280992 A | 10/2001 |
| JP | 2001-296134 A | 10/2001 |
| JP | 2002-286476 A | 10/2002 |
| JP | 2002-333337 A | 11/2002 |
| JP | 2007-085989 A | 4/2007 |
| JP | 2008-292415 A | 12/2008 |
| JP | 2009-128205 A | 6/2009 |
| JP | 2010-122093 A | 6/2010 |
| JP | 2012-189371 A | 10/2012 |
| JP | 2013-003048 A | 1/2013 |
| JP | 2013-200258 A | 10/2013 |
| JP | 2014-016248 A | 1/2014 |
| JP | 2014-081225 A | 5/2014 |
| JP | 2014-228429 A | 12/2014 |
| JP | 2015-169612 A | 9/2015 |
| JP | 2017-516070 A | 6/2017 |
| JP | 2017-156092 A | 9/2017 |
| WO | WO-2006/085740 A1 | 8/2006 |

OTHER PUBLICATIONS

Examination Report for European Application No. 17829773.5, dated Feb. 14, 2022.
Office Action for Chinese Patent Application No. 201780092009.1, dated Dec. 28, 2022.
Office Action for Japanese Patent Application No. 2021-179424, dated Jan. 13, 2023.
"Generate preferred route depending on class of vehicle and dynamic capabilities," Apr. 8, 2015, IP.com Prior Art Database Technical Disclosure, IPCOM000241247D, pp. 1-5 (Year: 2015).
"Naviontruck Motorbike Navigation," (2017). Retreived from the Internet at: <URL:http://store.naviontruck.com/>.
Examination Report for European Application No. 17817618.6, dated Aug. 18, 2021.
Examination Report for European Application No. 17817618.6, dated Oct. 12, 2020.
Examination Report for European Application No. 17829773.5, dated Apr. 22, 2021.
First Examination Report for India Application No. 201947051508, dated Apr. 30, 2021.
First Examination Report for India Application No. 201947051690, dated Jun. 17, 2021.

(56) References Cited

OTHER PUBLICATIONS

First Examination Report for India Application No. 201947051691, dated Mar. 9, 2021.

Handley et al., "Learning to Predict the Duration of an Automobile Trip", Proceedings of the Fourth International Conference on Knowledge Discovery and Data Mining, 1998, 5 pages.

Handley et al., "Learning to Predict the Duration of an Automobile Trip," Proceedings of the Fourth International Conference on Knowlege Discovery and Data Mining, pp. 1-5 (1998).

Harsur et al., "Voice Based Navigation System for Blind People Using Ultrasonic Sensor," International Journal on Recent and Innovation Trends in Computing and Communication, 3(6):4117-4122 (2015).

International Search Report and Written Opinion for Application No. PCT/US2017/064690, dated Aug. 7, 2018.

International Search Report and Written Opinion for Application No. PCT/US2017/064694, dated Sep. 3, 2018.

Notice of Reasons for Rejection for Japanese Application No. 2019-568638, dated Mar. 1, 2021.

Search Report and Written Opinion in International Application No. PCT/US2017/064690 dated Aug. 7, 2018, 15 pages.

Stevenson, "HERE launches beta test of bike routing on Android," (2016). Retreived from the Internet at: <URL:https://360.here.com/2016/05/11/here-launches-beta-test-of-bike-routing-on-android/>.

Ta-Yin Hu, Li-Wen Chen, Pai-Hsien Hung, Yung-Kuei Huang and Min-Ling Chiang, "An object-oriented simulation-assignment model with consideration of mixed traffic flows for its applications," 2006 IEEE Intelligent Transportation Systems Conference, 2006, pp. 1483-1488, doi: 10.1109/ITSC.2006.1707433. (Year: 2006).

Search Report and Written Opinion in International Application No. PCT/US2017/064693 dated Nov. 12, 2018, 20 pages.

Search Report and Written Opinion in International Application No. PCT/US2017/064694 dated Sep. 3, 2018, 16 pages.

Office Action for Korean Application No. 10-2019-7038222, dated Jan. 21, 2022.

Office Action for Chinese Patent Application No. 201780092008.7, dated Aug. 26, 2023.

Office Action for Chinese Patent Application No. 201780092009.1, dated Aug. 24, 2023.

\* cited by examiner

| POI | Score | Adjusted Score |
|---|---|---|
| A | 22 | 12 |
| B (LM) | 78 | 98 |
| C | 11 | 1 |
| D | 3 | 0 |
| E (LM) | 72 | 92 |
| F (LM) | 34 | 54 |
| G | 51 | 41 |
| H | 44 | 34 |

*FIG. 5*

LANDMARK-ASSISTED NAVIGATION

CROSS-REFERENCE TO RELATED APPLICATIONS

This is a continuation of U.S. patent application Ser. No. 16/328,920, entitled "Landmark-Assisted Navigation" and filed on Feb. 27, 2019, which is a national stage application of PCT Patent Application No. PCT/US17/64690, entitled "Landmark-Assisted Navigation" and filed on Dec. 5, 2017. The entire disclosure of each of the above-identified applications is hereby incorporated herein by reference.

FIELD OF TECHNOLOGY

The present invention relates to computer-assisted navigation and, more particularly, to the selective access and display of data corresponding to particular real-world locations.

BACKGROUND

The background description provided herein is for the purpose of generally presenting the context of the disclosure. Work of the presently named inventor(s), to the extent it is described in this background section, as well as aspects of the description that may not otherwise qualify as prior art at the time of filing, are neither expressly nor impliedly admitted as prior art against the present disclosure.

Currently available routing and navigation tools for computing devices (e.g., smartphones) are capable of presenting route-related information to a user via a graphical user interface. For example, a user entering a navigation request may be presented with a digital map that depicts the geographic area encompassing the route, and highlights the route itself. Such maps may also depict a number of "points of interest" (POIs), such as stores, restaurants, and so on. The POIs are typically indicated on the map at or near areas corresponding to the real-world locations of the POIs.

Data associated with the POIs (e.g., names of the POIs) is generally stored in a database, which can be accessed as needed when a POI (i.e., an appropriately located marker, name, etc., of the POI) is to be displayed to a user on the map. While certain algorithms may be used to limit the POIs for which information is to be retrieved and displayed (e.g., not displaying a particular POI below a certain zoom level, or not displaying a particular POI based on the number of users entering queries relating to that POI, etc.), users may nonetheless be presented with an overabundance of POI information in some scenarios. For example, users requesting directions according to different modes of travel may benefit from access to information about different kinds of POIs along a route. Presenting the same POIs to all users, regardless of the mode of travel, may lead to confusion or distraction for some users. Furthermore, displaying data for the same POIs to all users wastes computational resources. In the case of any users who are remote from the POI database, it may also waste communication resources.

SUMMARY

In some implementations described herein, a graphical user interface (GUI) provides efficient, intuitive and selective access to data in a database describing points of interest (POIs). Specifically, via the GUI, different categories of users (i.e., users associated with different travel modes) are able to access corresponding, appropriate data (e.g., data corresponding to POIs in a "landmark" category) from a database. In this way, computational and/or communication resources may be saved by not displaying to certain users POI-related data that is less likely to be of interest to them. Additionally, the risk of such users being confused or distracted by that POI-related data may be eliminated.

In one example embodiment, a computer-implemented method for providing landmark-assisted navigation guidance by selectively utilizing database information includes receiving a plurality of navigation requests from one or more mobile computing devices. Each of the navigation requests is associated with a respective starting point, destination, and travel mode. The method also includes, for each navigation request of the plurality of navigation requests, determining (based on the starting point, destination, and travel mode corresponding to the navigation request) a corresponding route to be depicted in a corresponding one of a plurality of digital maps. The method further includes, for each of the navigation requests associated with a first travel mode, (1) determining corresponding POIs, from among a plurality of POIs stored in a database, to be depicted in the corresponding digital map (with each of the corresponding POIs being associated in the database with one or more categories, and with the determination of the corresponding POIs being based at least in part on whether the corresponding POIs are associated with one or more categories included in a predetermined list of landmark categories), and (2) causing the corresponding digital map to be presented via a GUI of a respective one of the mobile computing devices, the corresponding digital map depicting the corresponding route and the corresponding POIs. The method still further includes, for each of the navigation requests associated with a second travel mode different than the first travel mode, (1) determining corresponding POIs (from among the plurality of POIs stored in the database) to be depicted in the corresponding digital map, irrespective of whether the corresponding POIs are associated with any categories included in the predetermined list of landmark categories, and (2) causing the corresponding digital map to be presented via a GUI of a respective one of the mobile computing devices, the corresponding digital map depicting the corresponding route and the corresponding POIs.

BRIEF DESCRIPTION OF THE DRAWINGS

FIG. 5 depicts an example scoring technique that may be used to determine which points of interest to display while in an enhanced travel mode.

DETAILED DESCRIPTION OF THE DRAWINGS

Overview

Figure 1:
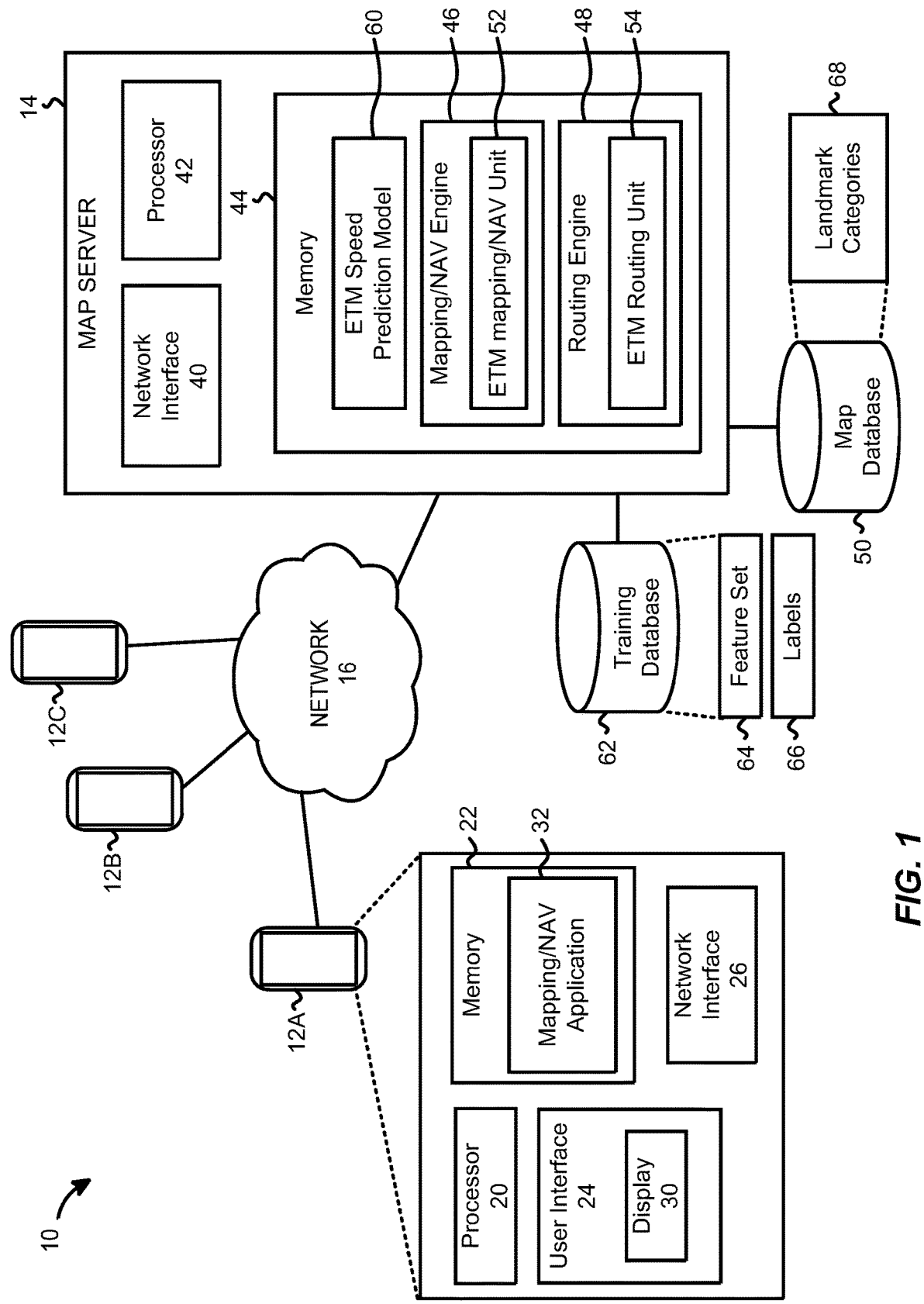
FIG. 1 is a block diagram of an example system in which navigation and routing techniques associated with an enhanced travel mode (e.g., for motorized two-wheel vehicles) may be implemented.

In some implementations described herein, special navigation and/or routing features and/or capabilities are provided to users who are exploring a particular travel mode of interest (e.g., a user-selected travel mode, or a default travel mode, etc.). For example, drivers of mopeds, scooters and/or motorcycles who make a navigation request associated with a "motorized two-wheel vehicle" travel mode (e.g., one among a set of modes that also includes a car mode, a bicycle mode, a transit mode, a walking mode, etc.) may be provided with certain features and/or capabilities that are generally beneficial to such users. Generally, a travel mode that gives rise to these special features and/or capabilities may be referred to herein as an "enhanced" travel mode.

In some implementations, routes that are "better" (e.g., faster, and/or safer, legal, etc.) when traveling via the enhanced travel mode are presented to the user. Such routes may be selected based on how well-suited certain road segments are for the enhanced travel mode. For example, whether a given road segment is particularly well-suited (or particularly ill-suited) for travel via the enhanced travel mode may be determined based on a classification or type of the road segment (e.g., alley, four-lane highway, a particular posted speed limit, etc.). For a motorized two-wheel vehicle travel mode, for instance, certain road segments may be so narrow as to make travel by car almost impossible, thereby decreasing the overall level of traffic and increasing travel speeds for those traveling via moped or scooter. Conversely, it may be illegal and/or unsafe to take a two-wheel vehicle on certain other road segments, such as expressways or road segments with a speed limit greater than some threshold speed.

Additionally or alternatively, in some implementations, speed predictions that are specific to a particular vehicle type (e.g., a vehicle type corresponding to the enhanced travel mode) may be generated using a machine learning model. The model may be trained using supervised learning techniques, with a feature set based on "mixed" vehicle type tracking data (e.g., GPS or other data from mobile computing devices in vehicles that may or may not correspond to motorized two-wheel vehicles), and labels based on tracking data specific to the particular vehicle type (e.g., a relatively sparse set of GPS or other data from mobile computing devices in vehicles known to be motorized two-wheel vehicles). If the feature set data and the label data both include speed information for enough of the same road segments (and possibly, for enough of the same times of day), the model may learn, for particular types of road segments (and possibly, for particular times of day), how speeds of vehicles corresponding to the particular vehicle type differ from aggregate speeds that are not specific to that vehicle type. Once trained, the machine learning model may accept as inputs real-time estimated or expected speeds (e.g., "mixed" vehicle type speeds) for particular road segments, and output speed predictions, for the particular vehicle type, that are specific to those road segments. These more accurate speed predictions may be used to provide better route selection for the enhanced travel mode, and/or to provide more accurate ETAs for the enhanced travel mode, for example.

Other features and/or capabilities provided to users exploring the enhanced travel mode may be more closely related to the graphical user interface (GUI) (e.g., the manner in which routes are depicted to users), and/or to the manner in which information in a local or remote database is selectively accessed and displayed in connection with the GUI. When a navigation request is made in connection with the enhanced travel mode, for example, a map depicting a best (e.g., fastest) route may be presented along with certain points of interest (POIs) that are likely to be useful as "landmarks," but would not otherwise be displayed to the user at the current zoom level. The decision to retrieve information corresponding to such POIs from a database (possibly via a long-range communication network), and to present such information to the user on a map, may be made based on a special field or attribute of the POI (stored in the database) indicating whether the POI is likely useful as a landmark. For example, POIs associated with categories that have been shown to facilitate the accurate memorization and/or following of directions (e.g., stadiums, museums, temples, and/or any other specific categories identified via market research or other means) may be treated as landmarks. Alternatively, certain POIs may be assigned a dedicated "landmark category" (e.g., by a system designer, or in some automated fashion), rather than (or in addition to) treating one or more other categories as being indicative of landmark status.

As another example, when a navigation request associated with the enhanced travel mode is entered, a map depicting a best route may be presented along with a specialized graphic (e.g., a circle containing an arrow pointing right or left) on or near each turn (or each major turn, etc.) of the depicted route. The user may select (e.g., tap with a finger) any of the turn graphics to view more information associated with the corresponding turn, such as a zoomed-in area of the map that is centered on that turn, street names at that turn, a travel time (e.g., ETA) from that turn to the destination specified by the navigation request, and so on. In some implementations, the user may view detailed information about another turn on the route by either exiting the turn information and selecting another turn graphic, or by swiping left or right (or, up or down) to move to the next or previous turn.

Example System

FIG. 1 illustrates an example system 10 in which navigation and routing techniques associated with an enhanced travel mode may be implemented. While FIG. 1 and various other figures show (and are described below with reference to) an implementation where the enhanced travel mode is a motorized two-wheel vehicle mode (e.g., for scooters, mopeds, etc.), it is understood that the enhanced travel mode may correspond to a different type of vehicle and/or a different type of travel in other implementations (e.g., a semi-trailer truck mode, etc.).

The example system 10 includes mobile computing devices 12 (each of which corresponds to a respective user), a map server 14, and a network 16. Map server 14 is remote from each of mobile computing devices 12, and is communicatively coupled to mobile computing devices 12 via network 16. Network 16 may include any suitable combination of wired and/or wireless communication networks, such as one or more local area networks (LANs), metropolitan area networks (MANs), and/or wide area network (WANs). As just one specific example, network 16 may include a cellular network, the Internet, and a server-side LAN. In some implementations, the portion(s) of network 16 used by one of mobile computing devices 12 (e.g., device 12A) to communicate with map server 14 may be wholly or partially separate from and independent of those portion(s) of network 16 that are used by another of mobile computing devices 12 (e.g., device 12B) to communicate with map server 14.

While shown in FIG. 1 as having a smartphone form factor, each of mobile computing devices 12 may be any portable computing device with wired and/or wireless communication capability (e.g., a smartphone, a tablet, a wearable device such as smart glasses or a smart watch, a vehicle head unit computer, etc.). In other implementations, the components and functionality of each of one or more of the mobile computing devices 12 are distributed among two or more devices, such as a smartphone and a smart watch of a single driver.

In the example implementation of FIG. 1, mobile computing device 12A includes a processor 20, a memory 22, a user interface 24, and a network interface 26. Processor 20 may be a single processor (e.g., a central processing unit (CPU)), or may include a set of processors (e.g., multiple CPUs, or a CPU and a graphics processing unit (GPU), etc.). Memory 22 is a computer-readable storage unit or device, or collection of units/devices, that may include persistent (e.g., hard disk and/or solid state) and/or non-persistent memory components. Memory 22 generally stores instructions that are executable on processor 20 to perform various operations, including the instructions of various software applications. Memory 22 may also store the data that is generated and/or used by such applications.

User interface 24 includes hardware, firmware and/or software configured to enable a user to interact with (i.e., both provide inputs to and perceive outputs of) the mobile computing device 12A, including at least a display 30 for providing visual outputs. Display 30 may be a touchscreen with both display and manual input (touch sensing) capabilities, or user interface 24 may include a separate mechanism for accepting user inputs (e.g., a keyboard and/or microphone, with associated processing components). Display 30 may include hardware, firmware and/or software conforming to any suitable type of display technology (e.g., LCD, LED, OLED, etc.).

Network interface 26 includes hardware, firmware and/or software configured to enable mobile computing device 12A to wirelessly exchange electronic data with map server 14 via network 16. For example, network interface 26 may include a cellular communication transceiver, a WiFi transceiver, and/or transceivers for one or more other wireless communication technologies.

In the example implementation of FIG. 1, memory 22 stores at least a mapping/navigation application 32. Generally, mapping/navigation application 32 is executed by processor 20 to cause user interface 24 to provide the user with a GUI presented on display 30, where the GUI enables the user to access the services provided by map server 14. For example, mapping/navigation application 32 may enable a user to enter a navigation request specifying a starting point, a destination and a travel mode, cause network interface 26 to transmit the request to map server 14 via network 16, process responsive map/route data (e.g., map tile data, route data, map element names/labels, POI information, etc.) that is received from map server 14 via network 16 and network interface 26, and cause display 30 to present a digital map (depicting the best/recommended route(s) for the travel mode) to the user based on the received map/route data.

Mapping/navigation application 32 may also enable the user of mobile computing device 12A to obtain other, related services. Moreover, mobile computing device 12A may also include other units not shown in FIG. 1, such as a satellite positioning (e.g., GPS) unit to assist in the positioning of mobile computing device 12A.

Each of mobile computing devices 12B and 12C may be the same as, or similar to, mobile computing device 12A. While FIG. 1 shows only mobile computing devices 12A through 12C, it is understood that map server 14 may be in communication with any number (e.g., tens or hundreds of thousands) of devices that are similar to one or more of mobile computing devices 12A through 12C at any given time.

Map server 14 may be associated with (e.g., owned and/or maintained by) a mapping/navigation service provider, and includes a network interface 40, a processor 42, and a memory 44. While referred to herein as a "server," map server 14 may, in some implementations, include multiple co-located or remotely distributed computing devices or systems.

Network interface 40 includes hardware, firmware and/or software configured to enable map server 14 to exchange electronic data with mobile computing devices 12 via network 16. For example, network interface 40 may include a wired or wireless router and a modem. Processor 42 may be a single processor (e.g., a CPU), or may include a set of processors (e.g., multiple CPUs, or a CPU and a GPU, etc.). Memory 44 is a computer-readable storage unit or device, or collection of units/devices, that may include persistent (e.g., hard disk and/or solid state) and/or non-persistent memory components. Memory 44 stores instructions of a mapping/navigation engine 46 and a routing engine 48, which may be executed by processor 42. In some implementations, mapping/navigation engine 46 and routing engine 48 are integrated, or mapping/navigation engine 46 is itself arranged as two distinct engines (mapping and navigation), etc.

Mapping/navigation engine 46 and routing engine 48 are generally configured to cooperate to provide client devices, such as mobile computing devices 12, with mapping and navigation services that are accessible via client device applications, such as mapping/navigation application 32. For example, mapping/navigation engine 46 may receive via network 16 a navigation request that was entered by the user of mobile computing device 12A via mapping/navigation application 32, and forward a starting point, destination and travel mode specified by (or otherwise associate with) the navigation request to routing engine 48. Routing engine 48 may determine a best (e.g., fastest) route, or set of routes, from the starting point to the destination. Route determination may be based in part on the specified travel mode, as discussed further below. Routing engine 48 may then pass the determined route(s) to mapping/navigation engine 46, which may retrieve map information corresponding to a geographic area that includes the determined route(s). The map information (e.g., data indicating roads, water and land areas, place names, POI positions/names, etc.) may be retrieved from a map database 50. Data relating to POIs that are in the geographic area that includes the determined route(s) may be selectively accessed/retrieved based in part on the specified travel mode, as is also discussed further below. Mapping/navigation engine 46 may then cause network interface 40 to transmit the map information retrieved from map database 50, along with any navigation data generated by mapping/navigation engine 46 (e.g., turn-by-turn text instructions), to mobile computing device 12A via network 16. Map database 50 may comprise one or more distinct databases, and may be stored in one or more memories (e.g., memory 44 and/or another memory) at one or more locations.

In the example implementation of FIG. 1, map server 14 supports a number of special features and/or capabilities that are specific to an enhanced travel mode. The enhanced travel mode may be a mode specific to a particular vehicle type, such as motorized two-wheel vehicles (e.g., scooters, mopeds, etc.), for example. Map server 14 may support a plurality of different travel modes (e.g., car, walking, biking, transit), of which the enhanced travel mode is just one user-selectable option. For example, mapping/navigation application 32 of mobile computing device 12A may cause display 30 to present a GUI that enables the user to select a specific travel mode when making a navigation request (e.g., by selecting the travel mode before entering/sending the request, or by changing to a new travel mode after sending the initial request, etc.). In some implementations, navigation requests are by default associated with a particular travel mode (e.g., car, or the enhanced travel mode, etc.) until and unless a new travel mode is manually selected by the user.

As noted above, routing engine 48 and mapping/navigation engine 46 may make use of the selected (or default, etc.) travel mode when determining a route, or when determining how to display the route and/or directions on a map, respectively. To this end, mapping/navigation engine 46 may include an enhanced travel mode (ETM) mapping/navigation unit 52, and routing engine 48 may include an ETM routing unit 54. While shown in FIG. 1 as distinct units, it is understood that the functionality/operation of ETM mapping/navigation unit 52 and ETM routing unit 54 may be integrated with other software units within the respective engines 46, 48.

In operation, if routing engine 48 determines that a navigation request received from mobile computing device 12A is associated with the enhanced travel mode, ETM routing unit 54 may determine/identify one or more routes that are particularly well-suited for travel according to that mode (e.g., travel via a motorized two-wheel vehicle). In one implementation, ETM routing unit 54 determines one or more best/recommended (e.g., fastest, safest, permissible, etc.) routes for the enhanced travel mode request by analyzing the type or category of one or more segments along potential routes. For example, map database 50 may store an indication of the type of each road segment. Thus, for instance, ETM routing unit 54 may determine that one road segment is a four-lane highway, while another road segment is an alley, and so on. ETM routing unit 54 may use this information to determine the route(s), based on which road types are more appropriate, or less appropriate, for travel via the enhanced travel mode. If the enhanced travel mode corresponds to motorized two-wheel vehicles, for example, then ETM routing unit 54 may give preference to road segments that cannot be traveled by cars (e.g., alleys). Additionally or alternatively, ETM routing unit 54 may exclude road segments that are off limits for the enhanced travel mode (e.g., if vehicles corresponding to that travel mode are not legally permitted on the road segments), or are otherwise not preferred for the enhanced travel mode (e.g., if it would be difficult or dangerous to travel on the road segments).

In some implementations, ETM routing unit 54 also, or instead, determines routes based on a travel time that is predicted specifically for the enhanced travel mode, which may in turn be based on road segment speeds that are predicted specifically for the enhanced travel mode. Travel time and/or speed predictions for the enhanced travel mode may be obtained by applying a simple adjustment (e.g., subtracting 10% from times associated with driving a car, or "mixed" vehicle travel times), or may apply a more complex adjustment (e.g., adding 15% to road segment speed estimates for cars or mixed traffic, but only in heavy traffic and on certain road types). In some implementations, travel time and/or speed may be predicted using a model that is specifically trained to predict speeds for the enhanced travel mode. In the implementation of FIG. 1, for example, map server 14 includes an ETM speed prediction model 60 for such a purpose. ETM speed prediction model 60 may be trained using data from a training database 62, including a feature set 64 and associated labels 66. Training database 62 may comprise one or more distinct databases, and may be stored in one or more memories (e.g., memory 44 and/or another memory) in one or more locations. Training and operation of ETM speed prediction model 60, according to some implementations, is described below in connection with FIG. 6. While training database 62 is depicted as being in communication with map server 14, it is understood that ETM speed prediction model 60 may instead have been trained using a different computing device or system, with model 60 being loaded into memory 44 only after training (or, an initial round of iterative training) is complete.

Once ETM routing unit 54 has determined a best route, or a best set of alternate routes, the route(s) may be passed to mapping/navigation engine 46. In this particular scenario, like routing engine 48, mapping/navigation engine 46 may determine that the travel mode associated with the navigation request is the enhanced travel mode. ETM mapping/navigation unit 52 then generates map/navigation data to support a GUI with features and/or capabilities specific to the enhanced travel mode.

For example, mapping/navigation engine 46 may retrieve map data that includes one or more landmark POIs that are known or believed to be particularly useful for accurately memorizing and/or following navigation directions. To accomplish this, mapping/navigation engine 46 may first determine the extent of the map that is needed to appropriately (e.g., fully) depict the determined route or routes, e.g., by selecting an appropriate center location of the map (such as latitude and longitude) and the map zoom level. Mapping/navigation engine 46 may then access map database 50 to determine which subset of POIs are in the geographic area represented within the map at that center location and zoom level. Within that subset of POIs, ETM mapping/navigation unit 52 may analyze POI categories that are stored in map database 50, and compare those categories with a predetermined (and possibly user-configurable) list of landmark categories 68. If a particular POI in the subset has a category that is in the list of landmark categories 68, ETM mapping/navigation engine causes the likelihood of that POI being displayed on the map at a particular zoom level to increase. For example, the landmark POI may be shown on the map at all zoom levels. Alternatively, a score for the landmark POI may be boosted such that the POI will appear at zoom levels lower than those at which it would otherwise appear. POI scores may also be based on one or more other factors, such as popularity of the POI, the current time of day, and so on. The threshold score for showing a particular POI on the map may vary based on the zoom level (e.g., with a higher score being required as the zoom level is decreased). Alternatively, the threshold may be fixed, and the zoom level may also affect the score (e.g., by adding more to the score at higher zoom levels). One example scoring method is discussed below with reference to FIG. 5.

The list of landmark categories 68 may be a list of various categories that correspond to landmarks (e.g., train stations, museums, temples, etc.). The landmark categories 68 may have been determined based on market research, for example. Alternatively, map database 50 may store indicators of which POIs are associated with a dedicated "landmark category," and ETM mapping/navigation unit 52 may simply determine whether each POI in the subset is associated with that dedicated category.

In some implementations, ETN mapping/navigation unit 52 also, or instead, provides the user with enhanced access to information about individual turns along the displayed route. After determining that the navigation request is associated with the enhanced travel mode, for example, ETN mapping/navigation unit 52 may identify all turns (e.g., all turns corresponding to a generated set of turn-by-turn navigation instructions) within the depicted route or routes. Thereafter, ETM mapping/navigation unit 52 may generate data that will cause the GUI of mobile computing device 12A to show specialized graphics at each of the identified turns. Each graphic may be a circle or other shape containing an arrow, for example, with each arrow indicating the direction of the turn. Alternatively, any other suitable type of graphic may be used. When displayed within the GUI, each graphic may be positioned (by ETN mapping/navigation unit 52) directly over the corresponding turn within the route, or at a location that is proximate to that turn.

In some implementations, the turn graphics are interactive. For example, a user may tap, with his or her finger, a particular turn graphic in order to access and view more detailed information about the corresponding turn. Tapping a turn graphic may cause the GUI to display a zoomed-in ("detail") view of the map that is centered or roughly centered on the corresponding turn, for instance. The map data needed for the detail view may be accessed by relaying a command to map server 14, which may retrieve the map data from map database 50. Alternatively, the map data needed for the detail view may have been pre-fetched and loaded into memory 22 of mobile computing device 12 at an earlier time.

Other information relevant to the turn may also be displayed in or with the detail view. For example, mapping/navigation engine 46 or routing engine 48 may determine the travel time (e.g., ETA) from the selected turn to the destination, and that time may be displayed in or with the detail view. As another example, the names of streets involved in the turn may be displayed within the detail view. More generally, mapping/navigation engine 46 may determine street names, POIs, and/or other map information to display based on the location of the turn and the zoom level used to view the turn, e.g., using the same algorithms that were used to display the map and route initially. For example, for the enhanced travel mode, ETM mapping/navigation unit 52 may again boost the scores of landmark POIs when generating the detail view of a turn.

The detail view of a turn may also support other user interactions. For example, the user may swipe (with his or her finger) in a particular direction to move directly to a detail view of the next (or the proceeding) turn. Optionally, the user may instead exit the detail view and select a turn graphic corresponding to a different turn.

Other GUI-related features and/or capabilities may also be presented or included when in the enhanced travel mode. For example, fewer roads that are within the map area, but not included in the preferred route or routes, may be displayed (as compared to other travel modes at the same zoom level). As other examples, a graphic corresponding to the enhanced travel mode (e.g., a stylized two-wheel vehicle icon) may be positioned at the starting point and/or the user's current location, and/or certain road types (e.g., alleys) may be color-coded differently, and so on. Various features and capabilities associated with the enhanced travel mode, including some of those discussed above, are discussed further below in connection with the example implementations of FIGS. 2B and 3 through 5.

Figure 3:
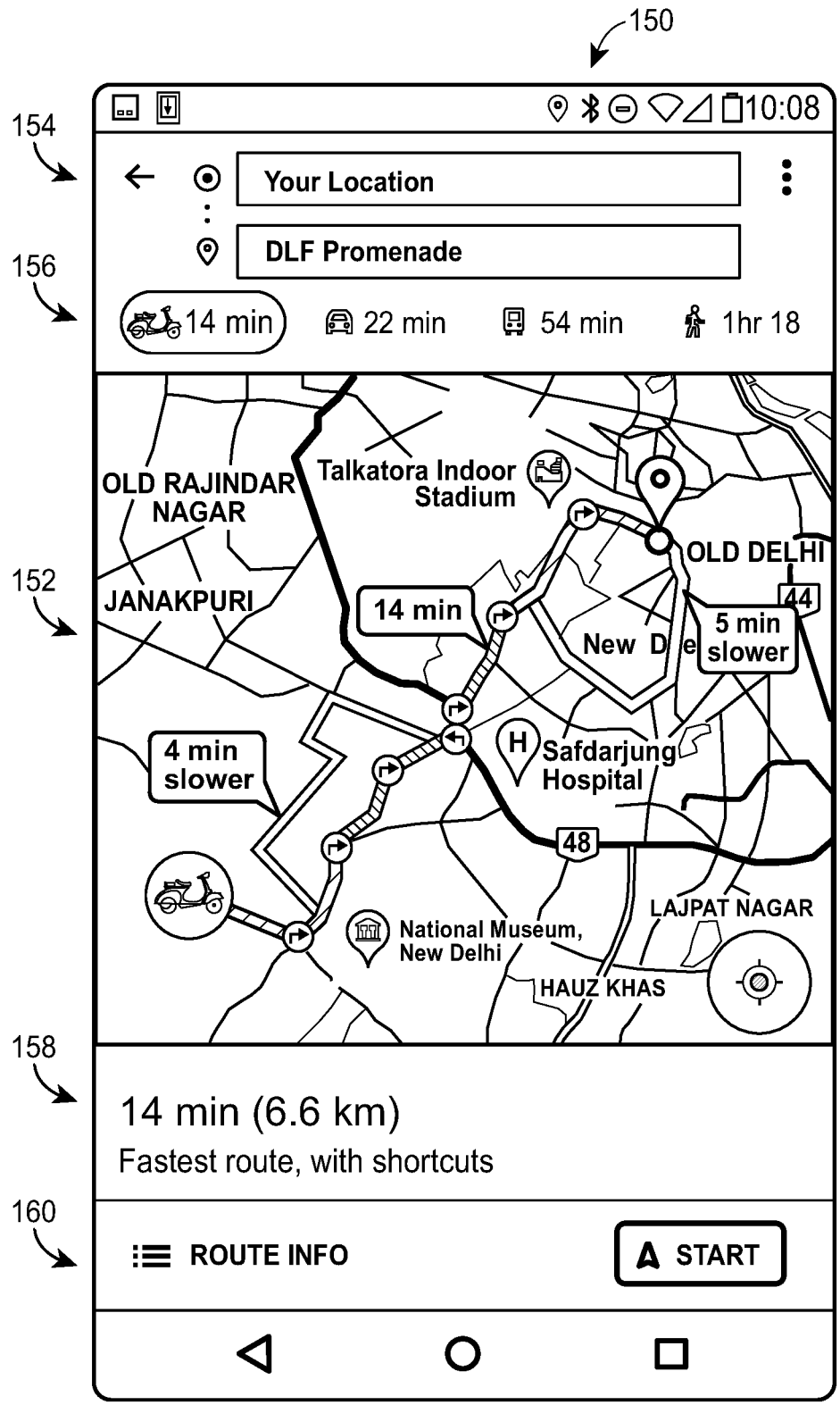
FIG. 3 depicts an example graphical user interface in which the viewport of FIGS. 2A and 2B may be presented.
Figure 4:
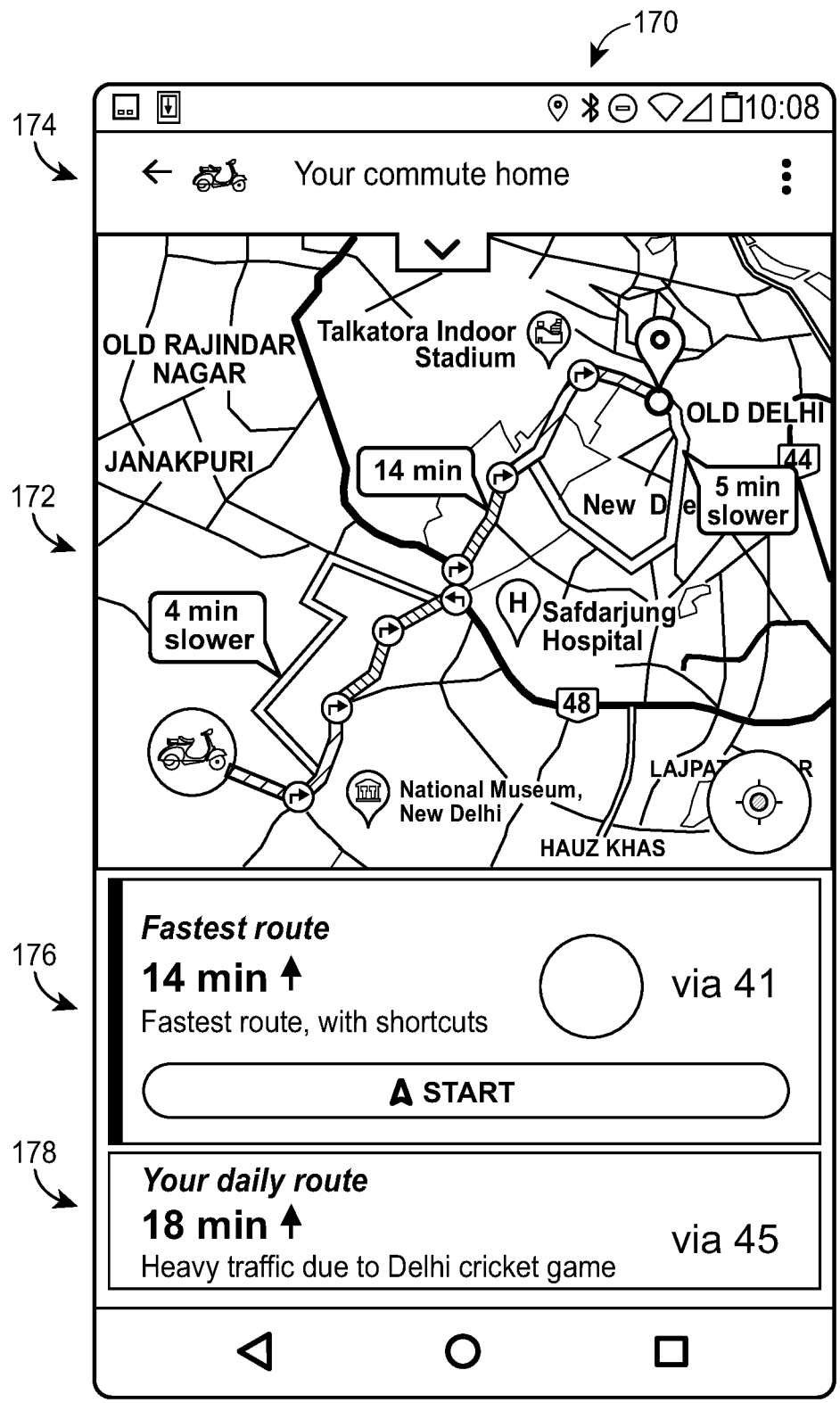
FIG. 4 depicts another example graphical user interface in which the viewport of FIGS. 2A and 2B may be presented.

Different aspects of the operation of system 10, according to various implementations, will now be described with reference to FIGS. 2 through 6. In particular, FIGS. 2 through 4 depict various GUIs (or GUI viewports) that may be presented by display 30 of mobile computing device 12A of FIG. 1, with the contents of each GUI or GUI viewport being generated by processor 20 when executing mapping/navigation application 32.

Example GUIs

Figure 2B:
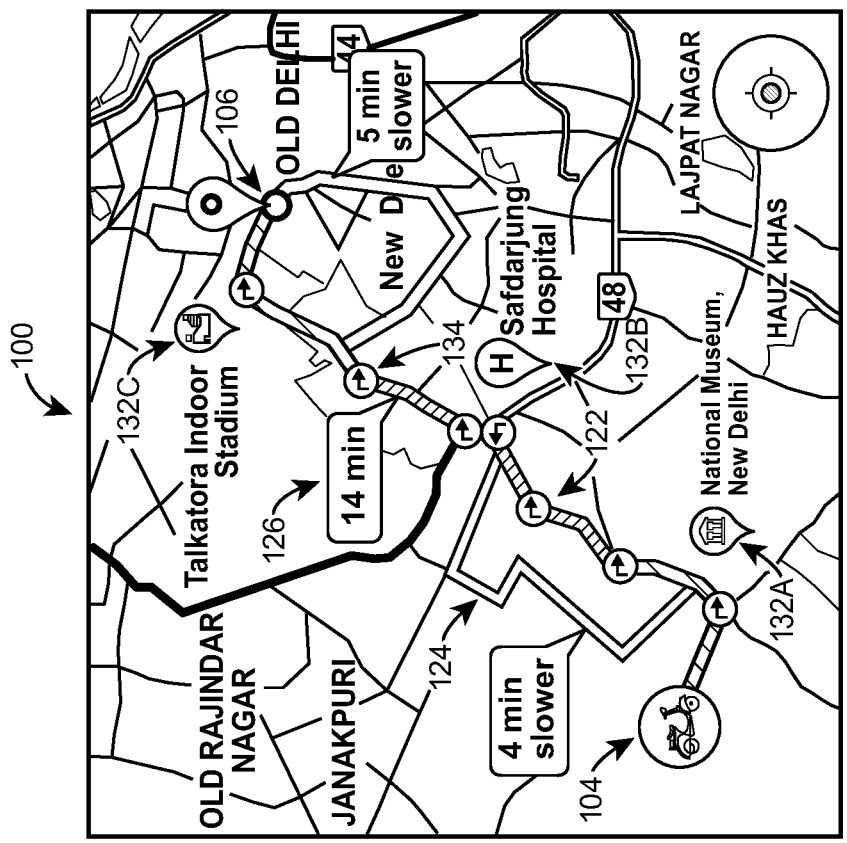
FIG. 2B depicts an example viewport of a graphical user interface that may be presented to a user in response to a navigation request that specifies the same starting point and destination shown in FIG. 2A, but where the navigation request is instead associated with a second, enhanced travel mode (e.g., for motorized two-wheel vehicles).
Figure 2A:
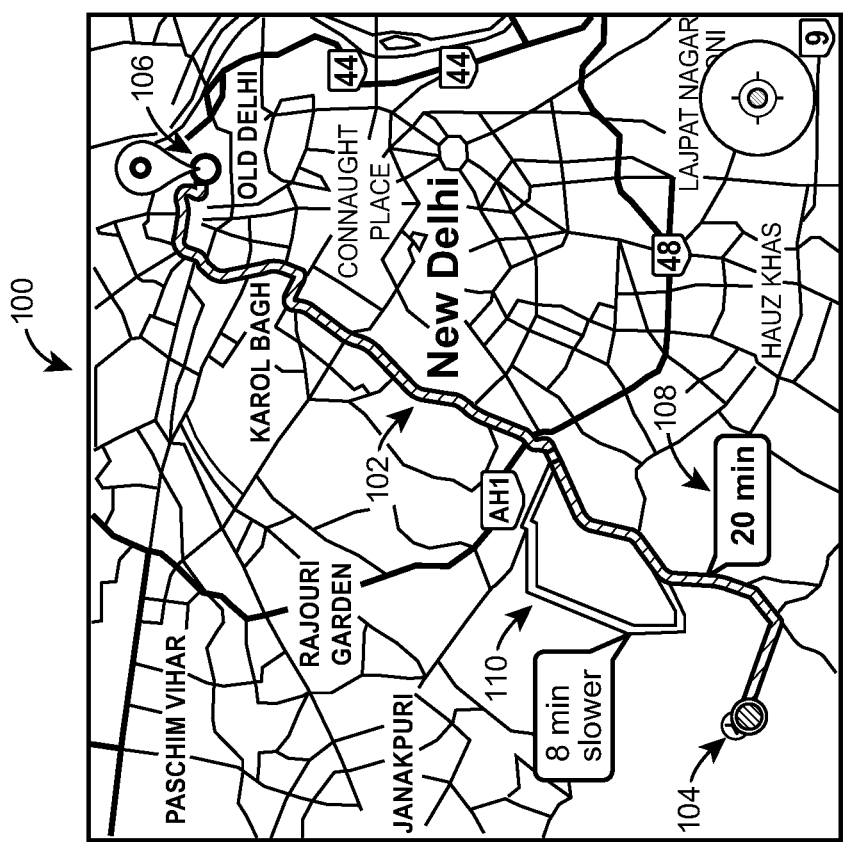
FIG. 2A depicts an example viewport of a graphical user interface that may be presented to a user in response to a navigation request that specifies a starting point and a destination, where the navigation request is associated with a first travel mode.

Referring first to FIGS. 2A and 2B, an example viewport 100 of a GUI is shown in two scenarios. In particular, FIG. 2A corresponds to a situation in which a navigation request associated with a travel mode other than the enhanced travel mode has been entered, and FIG. 2B corresponds to a situation in which a navigation request associated with the enhanced travel mode has been entered. If the enhanced travel mode is a motorized two-wheel vehicle mode, for example, FIG. 2A may depict the viewport 100 when a user requested directions and selected a car mode (or a car mode was the default travel mode), and FIG. 2B may depict the viewport 100 when the user subsequently selected the enhanced travel mode.

In FIG. 2A, the viewport 100 contains a map depicting a route 102, which represents a recommended path from a starting point 104 to a destination 106 (both of which may have been specified in the navigation request). In this example implementation, the viewport 100 also contains a predicted travel time 108 (here, 20 minutes), as well as a "next best" (e.g., next fastest) recommended route 110 that may be shaded and/or colored differently (e.g., less prominently) than the primary recommended route 102. Both route 102 and route 110 may have been generated by routing engine 48 of map server 14, for example.

By contrast, in FIG. 2B, viewport 100 contains a map depicting a different primary route 122 and a different secondary route 124, despite the fact that routes 122, 124 correspond to the same navigation request (e.g., the same starting point 104 and destination 106) as routes 102, 110 in FIG. 2A. This may be due to ETM routing unit 54 of map server 14 having accessed road type information in map database 50 to determine different routes for the enhanced travel mode, for example, and/or due to ETM routing unit 54 having predicted different speeds (and therefore different travel times) for various potential routes (e.g., based on the output of ETM speed prediction model 60), as discussed above with reference to FIG. 1 and further below with reference to FIG. 6. A predicted travel time 126 is also shown for the primary route 122. As seen, in this example scenario, the enhanced travel mode provides a shorter predicted travel time.

In this implementation, viewport 100 also differs in other respects due to the enhanced travel mode. For example, starting point 104 (and/or current user location) is represented by a graphic corresponding to the enhanced travel mode (here, a stylized icon of a motorized two-wheel vehicle). As another example, the secondary route 124 may be portrayed with a smaller line width than the primary route 122, to provide less distraction from the primary route 122.

As another example, the map of FIG. 2B depicts substantially fewer road segments than the map of FIG. 2A, in order to reduce clutter and distractions to the user. If mapping/navigation engine 46 of map server 14 calculates a score to determine whether to show a particular road segment at a particular zoom level (e.g., a score based on how often the road segment is traveled, and/or the road type for the road segment, etc.), for example, that score may be reduced, when in the enhanced travel mode, for any road segments that are within the map area but are not a part of the suggested route(s). The determination to hide certain road segments may have been made by ETM mapping/navigation unit 52 of FIG. 1 (e.g., by accessing road segment information in map database 50), for example.

As yet another example, the map of FIG. 2B depicts certain POIs that are not in the map of FIG. 2A, despite the same (or nearly the same) zoom level. In particular, in the depicted implementation and scenario, the map of FIG. 2B shows a number of POIs that have been determined to be in at least one of landmark categories 56 (or to belong to a dedicated landmark category): a museum 132A, a hospital 132B, and a stadium 132C. The determination to show the POIs 132A through 132C may have been made by ETM mapping/navigation unit 52 (e.g., by accessing POI information in map database 50), as discussed above with reference to FIG. 1, for example.

As still another example, the map of FIG. 2B includes, at each turn (or each major turn, e.g., each turn that requires moving from one street name to another, or requires merging, etc.), a turn graphic 134. In this example implementation, each turn graphic 134 is a circle with an arrow indicating the general direction of the turn (left or right). In other implementations, other graphics may be used, the arrows may be omitted (or may more precisely indicate the turn shape), and so on. As discussed above with reference to FIG. 1, the user may finger-tap (or otherwise select) a particular turn graphic 134, and in response be presented (in viewport 100) with a detail view of the map at the turn location and possibly other information (e.g., a predicted travel time from that turn to destination 106, etc.). Each turn graphic 134, and user interactions therewith, may be generated by mapping/navigation application 32 of mobile computing device 12A, and detailed turn information (e.g., map data for the detail view) may be retrieved from map database 50, and provided to mapping/navigation application 32, by ETM mapping/navigation unit 52 of map server 14 (e.g., by accessing road segment information in map database 50 after receiving an updated request from mobile communication device 12A), for example.

In other implementations, more, fewer, and/or different changes may be seen (or user interactivity supported) when in the enhanced travel mode as compare to some or all other modes.

FIG. 3 depicts an example GUI 150 in which the viewport 100 of FIGS. 2A and 2B may be presented, specifically for the scenario of FIG. 2B where the enhanced travel mode has been selected. As seen in FIG. 3, GUI 150 includes a viewport area 152 (which may include the viewport 100), a user interface 154 for entering and viewing a starting point and a destination for a navigation request, and a user interface 156 for selecting and viewing a travel mode for the navigation request. In the depicted scenario, the user has selected the enhanced travel mode (here, a motorized two-wheel vehicle mode), which is then highlighted within user interface 156. Alternatively, the enhanced travel mode may be the default setting. In the depicted implementation, a predicted travel time is shown for each of the available travel modes.

A GUI area 158 shows the predicted travel time for the primary and/or selected route (e.g., route 122 in FIG. 2B) and, in this implementation, a text descriptor concerning the route. In this implementation and scenario, the descriptor ("Fastest route, with shortcuts") indicates that the primary and/or selected route is the route that is predicted to have the shortest travel time to the destination, and that the route includes shortcuts (which may be available solely because the enhanced travel mode was chosen). Another user interface 160 may provide a control for starting a voice and/or turn-by-turn navigation mode, as well as a menu for accessing other route information, for example.

FIG. 4 depicts another example GUI 170 in which the viewport 100 of FIGS. 2A and 2B may be presented, again for the specific scenario of FIG. 2B where the enhanced travel mode has been selected or is the default setting. GUI 170, however, may be presented when a user has selected a previously-saved navigation request (here, a starting point and destination corresponding to the user's commute home). In GUI 170, a viewport area 172 includes a viewport (e.g., viewport 100), and an area 174 includes a text descriptor of the selected, previously-saved navigation request and an icon depicting the current travel mode (here, the enhanced travel mode). Further, an area 176 may depict information relating to the fastest route (e.g., route 122 of FIG. 2B), and an area 178 may depict information relating to the route typically taken by the user and associated information (e.g., traffic information, construction information, and/or other information indicative of changes to typical travel times).

Example Technique for Increasing Prominence of Landmark POIs

FIG. 5 depicts an example scoring technique 200 that may be used to determine which POIs to surface (i.e., show on the map depicting one or more suggested routes) while in an enhanced travel mode. The scoring technique 200 may be implemented by ETM mapping/navigation unit 52 in map server 14 of FIG. 1, for example. In the example scenario of FIG. 5, a set of POIs 202 represents the POIs that are within a geographic area represented by a map at the current center location and zoom level. As seen in FIG. 5, POIs B, E and F are associated with landmark categories (e.g., categories included in landmark categories 68 of FIG. 1), while POIs A, C, D, G and H are not associated with landmark categories. POIs B, E and F may be POIs 132A, 132B and 132C of FIG. 2B, for example. The determination of which POIs are associated with a landmark category may have been made by ETM mapping/navigation unit 52, by accessing POI-specific data stored in map database 50, and possibly also by accessing the list of landmark categories 68 in map database 50.

A score 204 is determined for each of POIs 202 (e.g., by ETM mapping/navigation unit 52). Each score 204 may have been calculated using any suitable technique. For example, each of scores 204 may have been determined based on the frequency of search queries for the POI, and/or any other suitable factors. An adjusted score 206 is calculated specifically for the enhanced travel mode, and reflects scoring after the presence of a landmark category, or the lack thereof, has been taken into account. In the implementation shown in FIG. 5, scores 204 are adjusted simply by subtracting 10 points for any POI that is not in a landmark category, and adding 20 points for any POI that is in a landmark category. In other implementations, scores 204 may not be adjusted for any POIs that are not in a landmark category, or more complex algorithms may be used to determine each of the adjusted scores 206, etc.

Each of adjusted scores 206 may be compared to a threshold to determine whether the corresponding POI is to be displayed on the map depicting the route(s). The threshold may be zoom-level dependent (e.g., with a higher threshold for lower zoom levels). If the threshold for the current zoom level is 50, for example, then the map will show POIs B, E and F when in the enhanced travel mode (e.g., motorized two-wheel vehicle mode), but instead show POIs B, E and H when in a different travel mode (e.g., car mode). Alternatively, the zoom level may itself be used to determine each of scores 204, and the threshold may be independent of zoom level (e.g., fixed).

Example Machine Learning Model for Predicting Speeds Specific to a Vehicle Type

Figure 6:
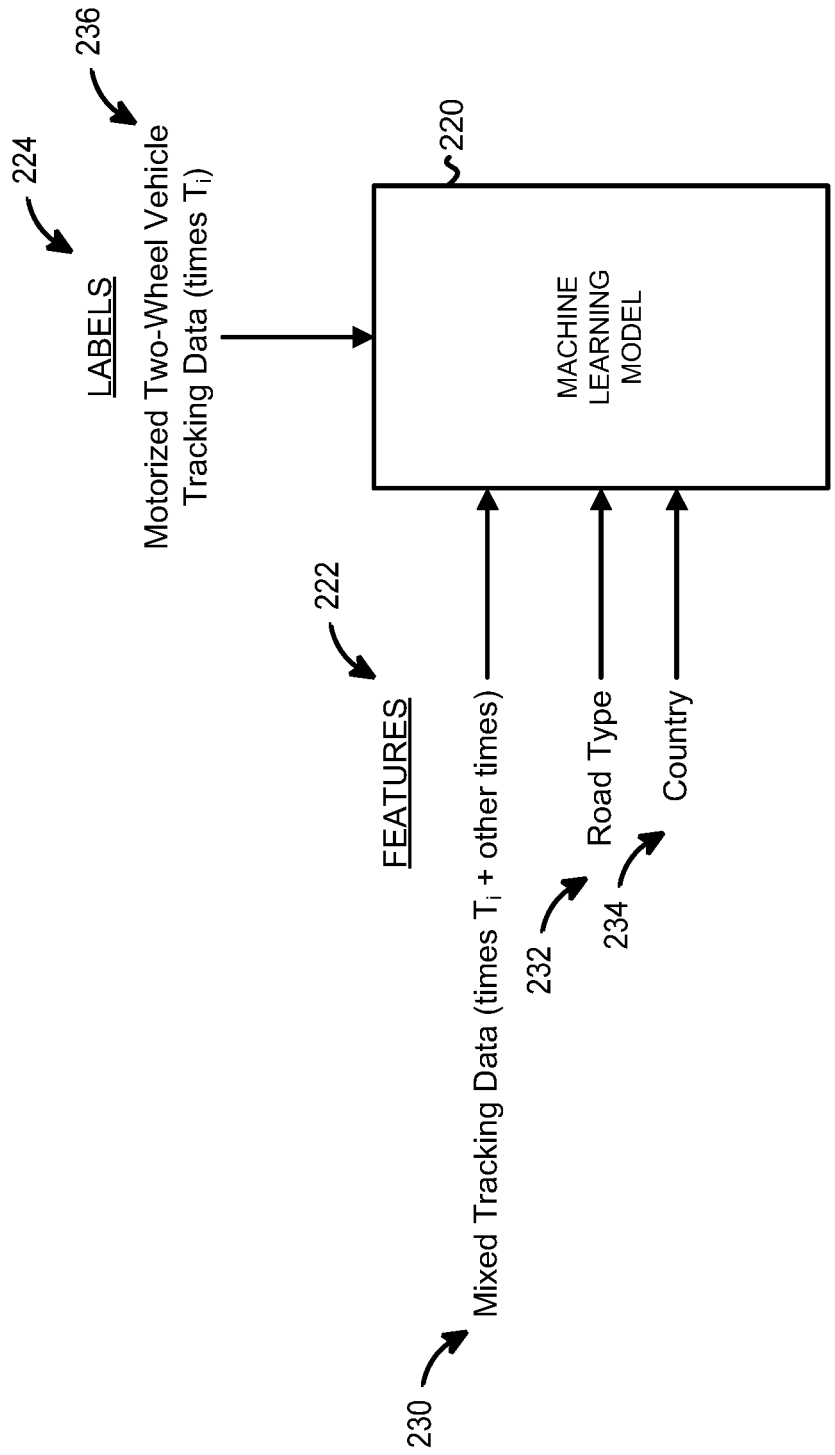
FIG. 6 depicts an example machine learning model being trained to predict road segment speeds corresponding to a particular vehicle type (e.g., motorized two-wheel vehicles).

FIG. 6 depicts an example machine learning model 220, during a training phase. Machine learning model 220 is used to predict speeds for a specific vehicle type, such as motorized two-wheel vehicles (mopeds, scooters, etc.). More specifically, machine learning model 220 may attempt to learn speed-related driving behaviors or characteristics of the particular vehicle type, as compared to one or more other vehicle types (e.g., cars), or as compared to unknown or "mixed" vehicle types. While FIG. 6 shows an implementation in which machine learning model 220 is trained to predict motorized two wheel vehicle speeds, it is understood that other implementations are also possible (e.g., semi-trailer truck speeds, speeds for more specific car types such as SUVs, etc.). Machine learning model 220 may be used as ETM speed prediction model 60 of FIG. 1, for example, with the specific vehicle type being one that corresponds to the enhanced travel mode.

Machine learning model 220 may include a neural network (e.g., a lattice-based or recurrent neural network), and may be trained using supervised learning techniques. In the implementation of FIG. 6, for example, machine learning model 220 is trained using features 222 and corresponding labels 224. Features 222 may represent the features in feature set 64 of FIG. 1, and labels 224 may represent the labels in labels 66 of FIG. 1, for example.

Features 222 include mixed tracking data 230 for mixed/unknown vehicle types. Mixed tracking data 230 may have been collected from mobile computing devices of different drivers (e.g., each similar to device 12A of FIG. 1), and includes device locations (e.g., GPS locations) with corresponding time stamps. Mixed tracking data 230 also includes instantaneous speed information associated with each location/time stamp. The speed information at each time may include a GPS Doppler-based speed, and/or a speed calculated from the GPS locations and time stamps, for example. While referred to herein as "instantaneous" speed, it is understood that some degree of averaging or other filtering may be used.

The mixed tracking data 230 may be a very large dataset (e.g., with data from hundreds of thousands of mobile devices in different vehicles), and includes data indicative of vehicle speeds at times $T_i$ (referenced further below) as well as other times. The mixed tracking data 230 may also include data from a wide variety of times of day (e.g., morning, mid-day, afternoon, evening, late night, etc.) and/or days of the week, over which traffic patterns may vary. In at least some scenarios, the mixed tracking data 230 may include enough information to enable machine learning model 220 to determine "free-flow" speeds on particular road segments, i.e., the speeds at which vehicles generally travel if not restricted by traffic, poor weather conditions, etc. Free-flow speeds may be at least loosely indicative of legal speed limits, for example. In other implementations, free-flow speeds (e.g., as determined from speed limits, or by processing the mixed tracking data 230 prior to the training of machine learning model 220) are provided as a separate feature within features 222.

In the implementation shown in FIG. 6, features 222 also include road type 232 and country 234. Road type 232 may indicate which type of road particular positions/speeds/times in mixed tracking data 230 are associated with (e.g., a two-lane highway, a four-lane highway, a side street, an alley, etc.). In other implementations, features 222 do not include road type 232. For example, machine learning model 220 may rely on characteristics that are inherent to mixed tracking data 230 (e.g., free-flow speeds, location deltas indicative of lane changing, etc.) to account for variations between different types of roads.

Country 234 may indicate which country particular positions/speeds/times in mixed tracking data 230 are associated with. Such information may be useful to machine learning model 220 due to different driving behaviors (and/or driving conditions, laws, etc.) in different countries. In other implementations, features 232 do not include country 232. For example, machine learning model 220 may rely on locations specified by mixed tracking data 230 to learn any distinctions arising from the country in which driving speeds need to be predicted. It is understood that machine learning model 220 may also include other suitable types of features not shown in FIG. 6 (e.g., weather conditions corresponding to each location/speed/time, etc.).

Labels 224 include motorized two-wheel vehicle ("MTWV") tracking data 236. MTWV tracking data 236 may have been collected from mobile computing devices of still other drivers (e.g., each similar to device 12A of FIG. 1), where it is known that each such driver was driving a motorized two-wheel vehicle (e.g., based on user inputs, or by deducing as much from various data sources, etc.). Similar to mixed tracking data 230, MTWV tracking data 236 may include information such as device locations (e.g., GPS locations), instantaneous speed information, and corresponding time stamps. As with the mixed tracking data 230, the speed information at each time may include a GPS Doppler-based speed, and/or a speed calculated from the GPS locations and time stamps. In other implementations, speed information in tracking data 236 is of a different type than speed information in tracking data 230.

The MTWV tracking data 236 may be a much smaller dataset than the mixed tracking data 230 (e.g., from only hundreds or a few thousand drivers), and like the mixed tracking data 230 includes data indicative of vehicle speeds at times $T_i$ (and possibly at other times, though not necessarily the same other times represented in mixed tracking data 230). The times $T_i$ may include times from a wide variety of times of day and/or days of the week. It is understood that the times $T_i$ may represent instantaneous points in time, or time windows. Moreover, the time overlap between mixed tracking data 230 and MTWV tracking data 236 does not necessarily mean that timestamps in the two sets of tracking data match each other precisely.

Machine learning model 220 takes advantage of the commonality in times $T_i$ between mixed tracking data 230 and MTWV tracking data 236, and the commonality in locations at those times, to learn how motorized two-wheel vehicle speeds tend to differ from mixed or aggregate speeds on particular road segment types (and/or specific road segments) at particular times of day and/or days of the week. As an example, mixed tracking data 230 may show that mixed traffic on road segment A generally moved at about 25 km/h during time window X, and that the free-flow speed on road segment A is about 70 km/h. MTWV tracking data 236 may show that, also on road segment A and also during (or approximately during) time window X, one or more motorized two-wheel vehicles moved at speeds between 35 and 40 km/h. From this feature and label information, machine learning model 220 may learn something about the ability of motorized two-wheel vehicles to move faster than general traffic (e.g., by weaving through traffic) on road segments that have the same free-flow speed as route segment A, and at times of day and/or days of the week that are similar to time window X.

Once trained, machine learning model 220 may accept, as inputs, real-time data generally corresponding to the types of information represented in features 222. For example, a real-time speed of general/mixed traffic on a particular road segment, at a particular time of day and day of the week, may be measured or estimated (e.g., based on GPS data from mobile computing devices of people currently driving), and fed into machine learning model 220 (possibly along with road type and/or country information). Machine learning model 220 may process those inputs and output a predicted speed for motorized two-wheel vehicles on the same road segment at that time of day and/or day of the week. As discussed above with reference to FIG. 1, predicted speeds output by machine learning model 220 may be used for various purposes, such as estimating route travel times (e.g., for identifying and recommending the fastest route), and/or presenting a predicted travel time to a desired destination.

Example Method for Providing Landmark-Assisted Navigation Guidance

An example method 300 for providing landmark-assisted navigation guidance by selectively utilizing database information is discussed next, with reference to FIG. 7. The method 300 may be implemented by one or more processors of a server or other computing device or system (e.g., by processor 42 of map server 14 of FIG. 1) when executing instructions of an application stored on a computer-readable medium (e.g., instructions of mapping/navigation engine 46 and/or routing engine 48 that are stored in memory 44 of FIG. 1).

At block 302, navigation requests are received from one or more mobile computing devices. The mobile computing devices may be similar to mobile computing device 12A of FIG. 1, for example. Each navigation request may be associated with a respective starting point, destination, and travel mode. The travel mode may indicate the type of vehicle (and/or the means for movement) for which route information is desired. For example, each navigation request may be associated with a travel mode selected from a group that includes a car mode, a motorized two-wheel vehicle mode, a walking mode, a bicycle mode, and a transit (e.g., public transit) mode. The navigation requests may have been entered by users of the mobile computing devices, using web browsers or dedicated mobile applications (e.g., mapping/navigation application 32 of FIG. 1).

At block 304, for each navigation request received at block 302, a corresponding route (to be depicted in a corresponding digital map) is determined. For example, a fastest (and possibly safest, etc.) route may be determined based on the starting point, the destination, and the travel mode corresponding to the navigation request. The route may be determined using any of the techniques discussed above in connection with routing engine 48 of FIG. 1, for example. For instance, the determination of the route may take into account the fact that the navigation request is associated with the first travel mode (e.g., by determining a classification of one or more road segments, and determining whether classifications are suitable for travel via the first travel mode, and/or determining whether the travel via the first travel mode is disallowed for any classifications, etc.). As another example, the determination of the route may take into account a predicted travel time that is specific to the first travel mode (e.g., a travel time calculated using speed predictions generated by ETM speed prediction model 60 of FIG. 1 or the trained machine learning model 220 of FIG. 6).

At block 306, for each navigation request (received at block 302) that is associated with a first (e.g., enhanced) travel mode, (1) corresponding POIs (to be depicted in the corresponding digital map) are determined from among a number of POIs stored in a database (e.g., map database 50 of FIGS. 1), and (2) the corresponding digital map is caused to be presented via a GUI of a respective one of the mobile computing devices. The first travel mode may be specific to a particular type of vehicle, such as motorized two-wheel vehicles.

The corresponding POIs are determined based at least on the zoom level of the corresponding digital map, and on whether the POIs are associated with one or more categories in a predetermined list of landmark categories. The "list" of landmark categories may be a list with multiple categories that have been flagged as being useful as navigating landmarks (e.g., museums, stadiums, restaurants, etc.) or, alternatively, may include only a single, dedicated landmark category that has been assigned to certain POIs. The POIs may be determined at block 306 using any suitable rules or algorithms that take at least zoom level, and the presence or absence of a landmark category, into account. For example, a scoring technique may be used that is similar to the technique discussed above with reference to FIG. 5.

The corresponding digital map may be caused to be presented via the GUI by, for example, retrieving information about the corresponding POIs from the database, and transmitting the retrieved information to a respective one of the mobile computing devices via a wireless communication network (e.g., network 16 of FIG. 1). When presented via the GUI, the digital map depicts the corresponding POIs determined at block 306, in addition to the corresponding route.

At block 308, for each navigation request (received at block 302) that is instead associated with a second, different travel mode, (1) corresponding POIs (to be depicted in the corresponding digital map) are determined from among the POIs stored in the database, and (2) the corresponding digital map is caused to be presented via a GUI of a respective one of the mobile computing devices. The second travel mode may be specific to a particular type of vehicle, such as cars, or may be any arbitrary travel mode other than the first travel mode (e.g., car, walking, bicycle, or transit), for example. Block 308 may be similar to block 306, but with the exception that the corresponding POIs are determined irrespective of whether each POI is associated with any category in the list of landmark categories.

Figure 7:
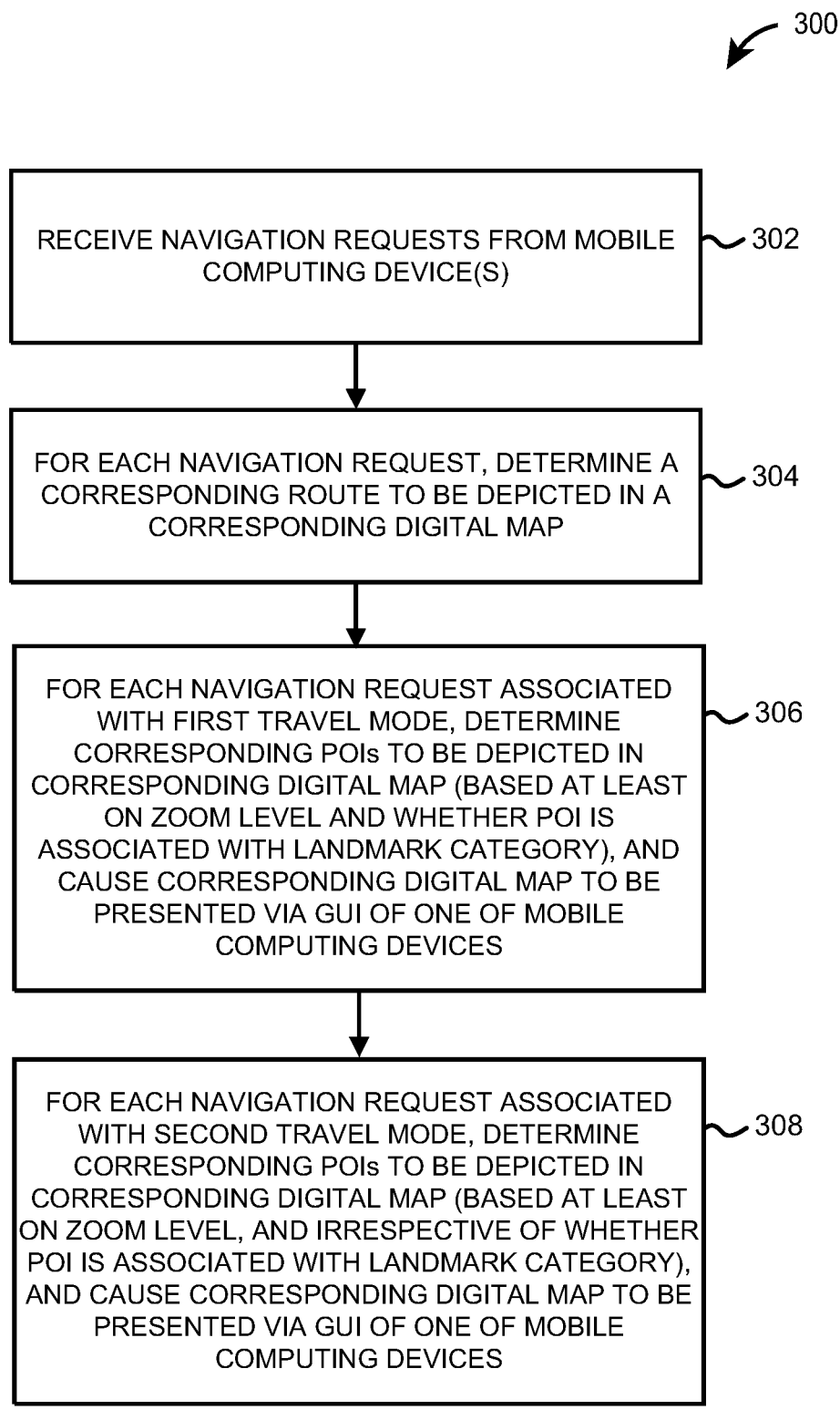
FIG. 7 is a flow diagram of an example method for providing landmark-assisted navigation guidance to users of mobile computing devices.

It is understood that the order of blocks depicted in FIG. 7 does not necessarily represent the timing of various operations in the method 300. For example, the operations of blocks 302, 304, 306 and 308 may be at least partially simultaneous, block 308 may begin before block 306, block 306 may end after block 308, and so on.

Example Method for Providing Turn-Specific Navigation Guidance

Figure 8:
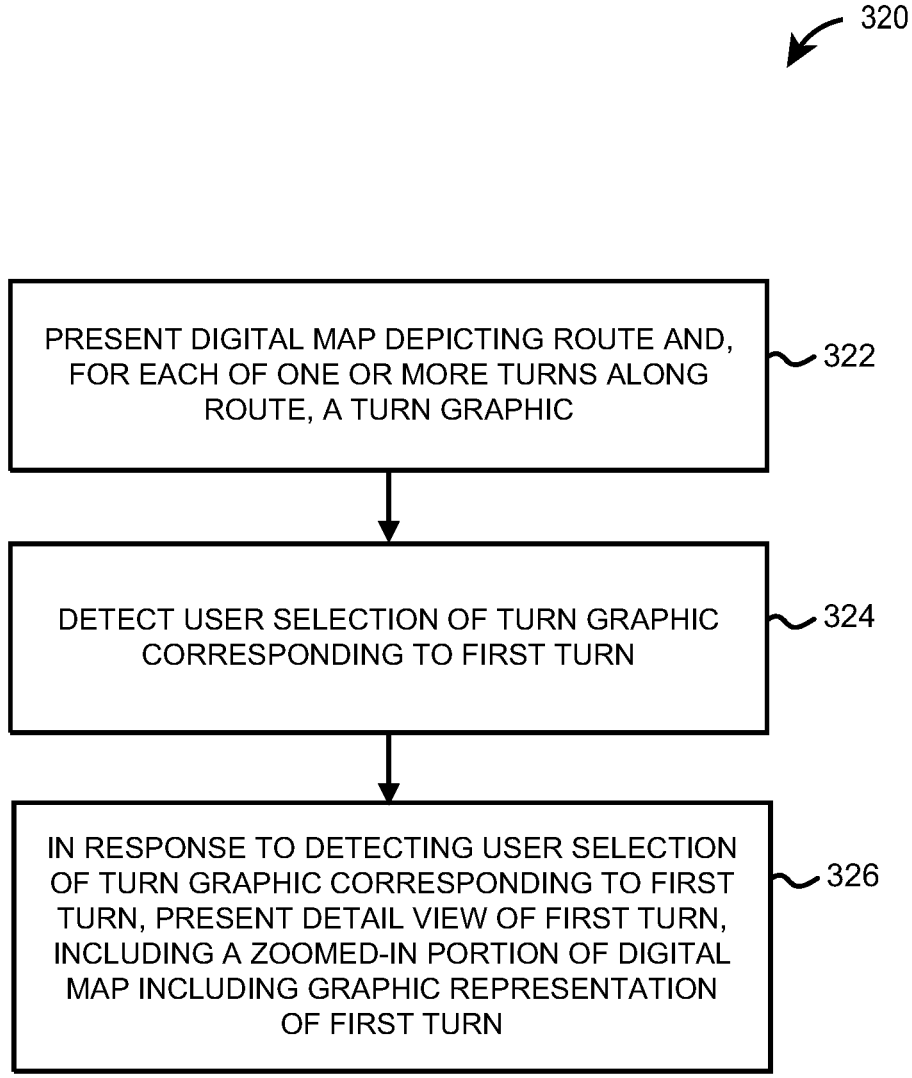
FIG. 8 is a flow diagram of an example method for providing turn-specific navigation guidance to a user of a mobile computing device.

An example method 320 for providing turn-specific navigation guidance to a user of a mobile computing device will now be discussed with reference to FIG. 8. The method 320 may be implemented by one or more processors of the mobile computing device (e.g., processor 20 of mobile computing device 12A in FIG. 1) when executing instructions of an application stored on a computer-readable medium (e.g., instructions of mapping/navigation application 32 stored in memory 22 of FIG. 1).

At block 322, a digital map is presented within a viewport provided by a GUI of the mobile computing device, with the map depicting a route and, for each of one or more turns along the route, a turn graphic. The GUI may be presented on display 30 of mobile computing device 12A in FIG. 1, for example. Each turn graphic is situated at an area of the digital map that depicts a portion of the route corresponding to the respective turn. Turn graphics may be superimposed directly over the turn (e.g., as shown in FIG. 2B), or at a location on the map that is touching or slightly offset from the turn, for example. The turn graphics may be any suitable size, color, shape, etc. For example, the turn graphics may be circles containing arrows corresponding to the general direction of the respective turn, as shown in FIG. 2B.

At block 324, a user selection (e.g., made via the GUI) of a turn graphic corresponding to a first one of the turns (though not necessarily the first/initial turn sequence-wise) is detected. The user selection may be a finger tap on a touch screen display, for example.

At block 326, in response to detecting the user selection of the turn graphic at block 324, a detail view of the first (i.e., selected) turn is presented via the GUI. The detail view includes a zoomed-in portion of the digital map, with the zoomed-in portion including a graphic representation of the first turn. In some implementations, the method 320 includes retrieving data representing the detail view from a remote database (e.g., map database 50 of FIG. 1), prior to block 326. Alternatively, the data may be retrieved from a local memory (e.g., if the user had previously selected the turn graphic, or if data for detail views of all turns was downloaded before the user selected any turn graphic).

The detail view may also include other information, such as street names, POIs (e.g., including landmark POIs presented in accordance with the method 300), and so on. As another example, the method 320 may include determining a predicted travel time from the first turn to a destination of the route (e.g., using ETM speed prediction 60, machine learning model 220, and/or the method 340 discussed below), and the detail view may include that predicted time.

In some implementations, the method 320 may include an additional block, occurring after block 326 and in response to detecting a finger swipe by the user (e.g., on the GUI), in which a detail view of a second turn that immediately follows or immediately precedes the first turn is presented to the user via the GUI (e.g., in place of the original detail view). The new detail view includes a different, zoomed-in portion of the digital map, which includes a graphic representation of the second turn (and possibly a travel time from the second turn to the destination, etc.).

Additionally, or alternatively, the method 320 may include an additional block in which it is determined that a navigation request specifying the route destination and starting point is associated with a first travel mode (e.g., an enhanced travel mode, as discussed above with reference to earlier figures). In this implementation, the turn graphic(s) may be included in the digital map in response to the determination that the navigation request is associated with the first travel mode. A graphic explicitly indicating the travel mode may also be included in the digital map (e.g., at the starting point, or at the user's current location, etc.).

Additionally, or alternatively, the method 320 may include a first additional block, occurring prior to block 322, in which a navigation request is transmitted from the mobile computing device to a remote server, with the navigation request specifying the route starting point and destination, and a second additional block in which data representing at least some of the digital map is received from the remote server in response to the navigation request. Also in this implementation, the method 320 may include a third additional block, occurring prior to transmission of the navigation request, in which the navigation request is generated based on a user indication of the route starting point and destination.

Example Method for Predicting Speeds for a Particular Vehicle Type

Figure 9:
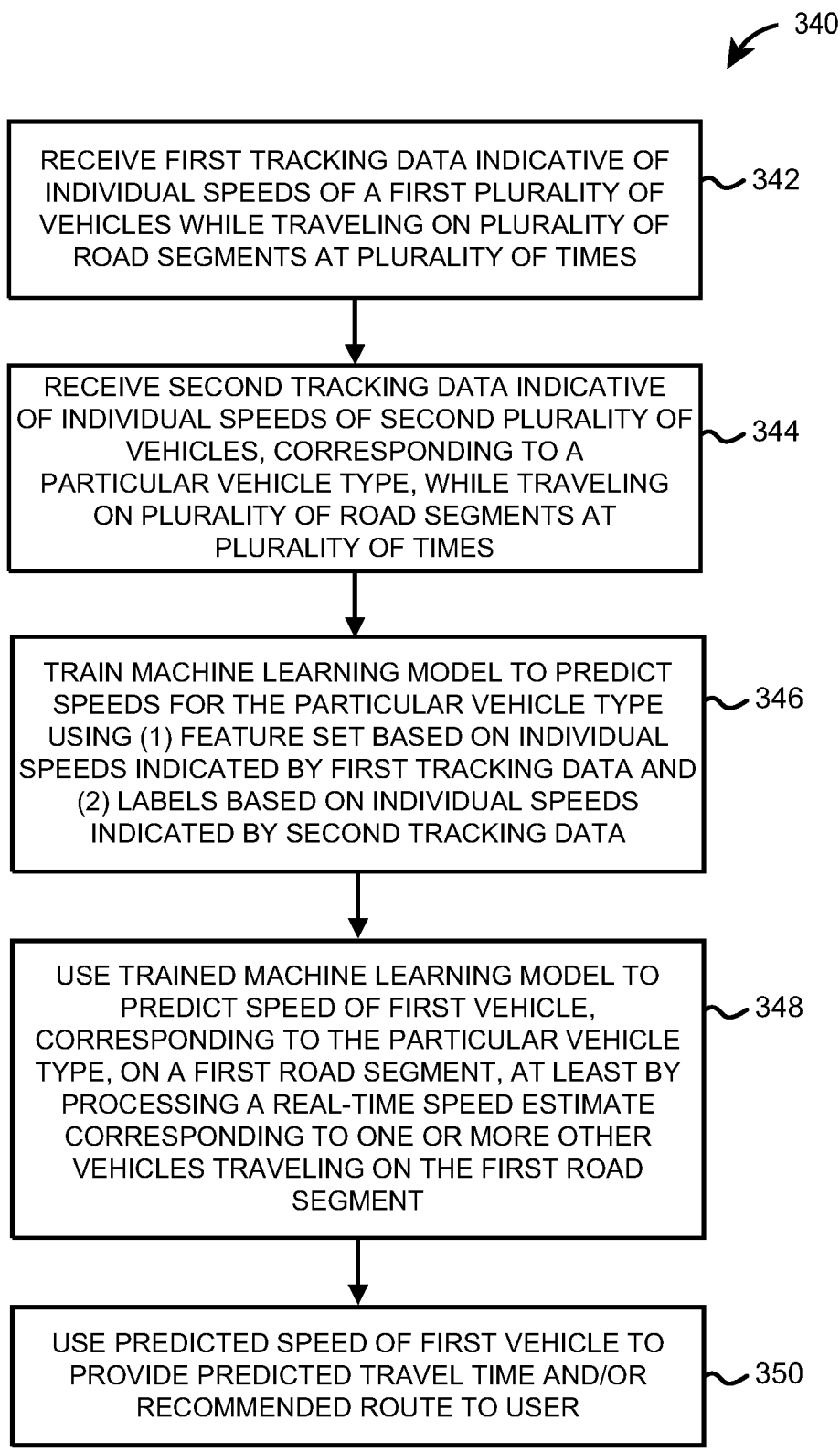
FIG. 9 is a flow diagram of an example method for predicting speeds for a particular vehicle type.

An example method 340 for predicting speeds for a particular type of vehicle will now be discussed with reference to FIG. 9. The method 340 may be implemented by one or more processors of a computing device or system (e.g., by processor 42 of map server 14 in FIG. 1) when executing instructions of an application stored on a computer-readable medium (e.g., instructions that are stored in memory 44 of FIG. 1). In some implementations, a computing system performing the method 340 may include a number of distinct (e.g., remotely located) subsystems. For example, blocks 342 through 346 may be performed by a first computer system in a first location, while blocks 348 and 350 are performed by a second computer system in a second location (or possibly, with block 350 being performed by a third computer system in a third location, etc.).

At block 342, tracking data ("first tracking data") that is indicative of individual speeds of a first plurality of vehicles, while traveling on a plurality of road segments at a plurality of times, is received (e.g., from mobile computing devices of driving users, or after subsequent processing). The first plurality of vehicles may be of mixed/unknown types (e.g., cars, trucks, mopeds, etc.). In other implementations, however, the first plurality of vehicles is of a known type or range of types (e.g., cars and trucks only).

At block 344, tracking data ("second tracking data") that is indicative of individual speeds of a second plurality of vehicles, while traveling on the same plurality of road segments at the same plurality of times, is also received (e.g., from mobile computing devices of driving users, or after subsequent processing). However, the second plurality of vehicles correspond to the particular vehicle type for which the model will be trained to predict speeds (e.g., motorized two-wheel vehicles).

The first and/or second tracking data may include GPS-Doppler speeds, speeds derived from GPS positions and time stamps, and/or speeds derived in one or more other ways. The first tracking data may be a much larger dataset than the second tracking data, and may also be indicative of individual speeds of vehicles traveling on the same road segments at other times not reflected in the second tracking data.

At block 346, a machine learning model is trained to predict speeds for the particular vehicle type. The model (e.g., including a lattice neural network, or other suitable neural network) may be trained using a feature set that is based on the individual speeds indicated by the first tracking data, as well as labels that are based on the individual speeds indicated by the second tracking data. The model may use the large amount of "historical" data included in the first tracking data to learn more about the road segments that are represented in both the first and second tracking data. For example, the model may learn free-flow speeds for the road segments, e.g., by looking at the maximum speeds (excluding outliers) on those road segments. Alternatively, the method 340 may include an additional block where the first tracking data is pre-processed to determine the free-flow speeds of the road segments, with the free-flow speeds then being used as an additional feature in the feature set. In either case, the model may observe and learn how speeds of vehicles of the vehicle type represented by the second tracking data differ from speeds of the vehicle type(s) represented by the first tracking data, on the same road segments and at the same times, and in view of the free-flow speeds for those road segments.

At block 348, the trained model is used to predict a speed of a specific vehicle corresponding to the particular vehicle type ("first vehicle"), on a specific road segment ("first road segment"), at least by processing a real-time speed estimate corresponding to one or more other vehicles traveling on the first road segment. The real-time speed estimate may be an average (or geometric mean, etc.) speed calculated from GPS-derived speeds provided by mobile computing devices of vehicles (e.g., cars) that are currently traveling on the first road segment, for example. Alternatively, the real-time speed estimate may be determined in another suitable manner (e.g., based on data provided by "smart" infrastructure associated with the first road segment, etc.).

At block 350, the speed predicted at block 348 (and possibly one or more other predicted speeds corresponding to other road segments along a same route) is used to provide a predicted travel time, and/or a recommended route, to a user (e.g., to the driver of the first vehicle). Block 350 may include transmitting the predicted travel time and/or the recommended route to a mobile computing device of the user that had made a navigation request, for example.

In one implementation, the method 340 includes an additional block in which road type data, indicative of road types associated with the road segments discussed above in connection with blocks 342 and 344, is received. In this implementation, the feature set used at block 346 may further include the road type indicated by the road type data, and block 348 may include using the model to process not only the real-time speed estimate, but also an indication of a road type corresponding to the first road segment.

In another implementation, the method 340 includes an additional block in which country data, indicative of countries associated with the road segments discussed above in connection with blocks 342 and 344, is received. In this implementation, the feature set used at block 346 may further include the country indicated by the country data, and block 348 may include using the model to process not only the real-time speed estimate, but also an indication of a country corresponding to the first road segment.

In yet another implementation, the method 340 includes receiving a navigation request from a particular mobile computing device, where the navigation request may specify a particular travel mode (e.g., the enhanced travel mode as discussed above). In this implementation, block 348 may occur in response to receiving the navigation request from that mobile computing device.

Other Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Unless specifically stated otherwise, discussions in the present disclosure using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used in the present disclosure any reference to "one implementation" or "an implementation" means that a particular element, feature, structure, or characteristic described in connection with the implementation is included in at least one implementation or embodiment. The appearances of the phrase "in one implementation" in various places in the specification are not necessarily all referring to the same implementation.

As used in the present disclosure, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for providing routing and/or navigation-related features and/or capabilities through the principles in the present disclosure. Thus, while particular embodiments and applications have been illustrated and described, it is to be understood that the disclosed embodiments are not limited to the precise construction and components disclosed in the present disclosure. Various modifications, changes and variations, which will be apparent to those skilled in the art, may be made in the arrangement, operation and details of the method and apparatus disclosed in the present disclosure without departing from the spirit and scope defined in the appended claims.

What is claimed is:

1. A computer-implemented method for providing landmark-assisted navigation guidance by selectively utilizing database information, the method comprising:
   receiving a plurality of navigation requests from one or more mobile computing devices, each of the navigation requests being associated with a respective starting point, destination, and travel mode;
   for each navigation request of the plurality of navigation requests, determining, based on the starting point and the destination corresponding to the navigation request, a corresponding route to be depicted in a corresponding one of a plurality of digital maps;
   for each of the navigation requests associated with a first travel mode,
      determining corresponding points of interest, from among a plurality of points of interest stored in a database, to be depicted in the corresponding digital map, wherein each of the corresponding points of interest is associated in the database with one or more categories, and wherein determining the corresponding points of interest is based at least in part on whether the corresponding points of interest are associated with one or more categories included in a predetermined list of landmark categories corresponding to landmarks for navigation, and
      causing the corresponding digital map to be presented via a graphical user interface of a respective one of the mobile computing devices, the corresponding digital map depicting the corresponding route and the corresponding points of interest; and
   for each of the navigation requests associated with a second travel mode different than the first travel mode,
      determining corresponding points of interest, from among the plurality of points of interest stored in the database, to be depicted in the corresponding digital map irrespective of whether the corresponding points of interest are associated with any categories included in the predetermined list of landmark categories, and
      causing the corresponding digital map to be presented via a graphical user interface of a respective one of the mobile computing devices, the corresponding digital map depicting the corresponding route and the corresponding points of interest.

2. The method of claim 1, wherein the first travel mode is a travel mode specific to a particular vehicle type.

3. The method of claim 2, wherein the first travel mode is a travel mode specific to motorized two-wheel vehicles.

4. The method of claim 1, wherein for each of the navigation requests associated with the first travel mode:
   determining the corresponding points of interest includes (i) determining scores for the plurality of points of interest, each score being at least partially based on whether the respective point of interest is associated with one or more categories included in the predetermined list of landmark categories, and (ii) selecting the corresponding points of interest based on the determined scores.

5. The method of claim 4, wherein selecting the corresponding points of interest includes:
   determining a threshold score based on a zoom level; and
   determining whether each of the determined scores exceeds the threshold score.

6. The method of claim 1, wherein for at least one navigation request of the plurality of navigation requests:
   determining a corresponding route includes determining a route that is specific to the first travel mode.

7. The method of claim 6, wherein determining a route that is specific to the first travel mode includes:
   determining a classification of one or more road segments; and
   determining whether the one or more classifications are suitable for travel via the first travel mode.

8. The method of claim 6, wherein determining a route that is specific to the first travel mode includes:
   determining a classification of one or more road segments; and
   determining whether travel via the first travel mode is disallowed for the one or more classifications.

9. The method of claim 1, wherein for at least one navigation request of the plurality of navigation requests:
   determining a corresponding route includes predicting a travel time that is specific to the first travel mode.

10. The method of claim 1, wherein for each of the navigation requests associated with the first travel mode:
    determining the corresponding points of interest includes, for each corresponding point of interest, (i) determining one or more categories associated with the corresponding point of interest, and (ii) determining whether the one or more categories associated with the corresponding point of interest are included in the predetermined list of landmark categories.

11. The method of claim 1, wherein for each of the navigation requests associated with the first travel mode:
    determining the corresponding points of interest includes, for each corresponding point of interest, (i) determining one or more categories associated with the corresponding point of interest, and (ii) determining whether any of the one or more categories associated with the corresponding point of interest is a landmark category.

12. The method of claim 1, wherein for each of the navigation requests associated with the first travel mode, and for each of the navigation requests associated with the second travel mode:
    causing the corresponding digital map to be presented via a graphical user interface of one of the mobile computing devices includes (i) retrieving information about the corresponding points of interest from the database, and (ii) transmitting the retrieved information about the corresponding points of interest to the respective one of the mobile computing devices via a wireless communication network.

13. One or more servers including one or more processors configured to:
    receive a plurality of navigation requests from one or more mobile computing devices, each of the navigation requests being associated with a respective starting point, destination, and travel mode;
    for each navigation request of the plurality of navigation requests, determine, based on the starting point and the destination corresponding to the navigation request, a corresponding route to be depicted in a corresponding one of a plurality of digital maps;
    for each of the navigation requests associated with a first travel mode, determine corresponding points of interest, from among a plurality of points of interest stored in a database, to be depicted in the corresponding digital map, wherein each of the corresponding points of interest is associated in the database with one or more categories, and wherein determining the corresponding points of interest is based at least in part on whether the corresponding points of interest are associated with one or more categories included in a predetermined list of landmark categories corresponding to landmarks for navigation, and cause the corresponding digital map to be presented via a graphical user interface of a respective one of the mobile computing devices, the corresponding digital map depicting the corresponding route and the corresponding points of interest; and for each of the navigation requests associated with a second travel mode different than the first travel mode, determine corresponding points of interest, from among the plurality of points of interest stored in the database, to be depicted in the corresponding digital map irrespective of whether the corresponding points of interest are associated with any categories included in the predetermined list of landmark categories, and cause the corresponding digital map to be presented via a graphical user interface of a respective one of the mobile computing devices, the corresponding digital map depicting the corresponding route and the corresponding points of interest.

14. The one or more servers of claim 13, wherein the first travel mode is a travel mode specific to a particular vehicle type.

15. The one or more servers of claim 14, wherein the first travel mode is a travel mode specific to motorized two-wheel vehicles.

16. The one or more servers of claim 13, wherein for each of the navigation requests associated with the first travel mode:

determining the corresponding points of interest includes (i) determining scores for the plurality of points of interest, each score being at least partially based on whether the respective point of interest is associated with one or more categories included in the predetermined list of landmark categories, and (ii) selecting the corresponding points of interest based on the determined scores.

17. The one or more servers of claim 16, wherein selecting the corresponding points of interest includes:

determining a threshold score based on a zoom level; and determining whether each of the determined scores exceeds the threshold score.

18. The one or more servers of claim 13, wherein for at least one navigation request of the plurality of navigation requests:

determining a corresponding route includes determining a route that is specific to the first travel mode.

19. The one or more servers of claim 18, wherein determining a route that is specific to the first travel mode includes:

determining a classification of one or more road segments; and determining whether the one or more classifications are suitable for travel via the first travel mode.

20. The one or more servers of claim 18, wherein determining a route that is specific to the first travel mode includes:

determining a classification of one or more road segments; and determining whether travel via the first travel mode is disallowed for the one or more classifications.

* * * * *